United States Patent [19]
Tock et al.

[11] Patent Number: 5,637,312
[45] Date of Patent: Jun. 10, 1997

[54] DIGESTION ENHANCER FOR RUMINANT ANIMALS COMPRISING A FORMATE SALT

[76] Inventors: Richard W. Tock, 4916 76th St., Lubbock, Tex. 79424-2147; Carl R. Richardson, 8010 Raleigh, Lubbock, Tex. 79424

[21] Appl. No.: 412,460

[22] Filed: Mar. 29, 1995

[51] Int. Cl.$^6$ .................................................. A23K 1/12
[52] U.S. Cl. .................. 424/438; 426/658; 426/807; 426/2; 426/71; 426/74; 426/302; 426/635; 426/636; 119/174; 119/51.01; 119/51.03; 514/554; 514/557
[58] Field of Search ....................... 426/658, 807, 426/2, 71, 74, 302, 635, 636; 424/438; 119/174, 51.01; 514/554, 557

[56] References Cited

U.S. PATENT DOCUMENTS

| | | | |
|---|---|---|---|
| 3,595,665 | 7/1971 | Huitson et al. | 99/8 |
| 3,899,588 | 8/1975 | Skov et al. | 424/317 |
| 4,857,338 | 8/1989 | Ybema et al. | 426/2 |
| 5,032,239 | 7/1991 | Sweeney | 204/131 |

OTHER PUBLICATIONS

Derwent Abstracts 93–375777/47, "Preparation of Fodder for Ruminant Animals", S.V Martynov. Nov. 1992.
Derwent Abstracts 71–28794S/17, "Paraffin Oxidation Waste Liquor for Feedstuff", G. Lauermann. Dec. 1969.
Carroll, E.J. et al., Formate Dissimilation and Methane Production in Bovine Rumen Contents; From the Department of Bacteriology and Public Health, State College of Washington, Pullman, Washington, Jan. 17, 1995.
Tanaka, H. et al., Effect of p–coumaric acid on cellulose utilization by rumen fungi with or without methanogen, *Animal Science and Technology*, vol. 63, No. 9, 1992 (pp. 917–923). (Computer search abstract only enclosed.).
Jacobs, J.L. et al., Protein supplementation of formic acid–and enzyme–treated silages, *Grass and Forage Science*, vol. 47, No. 2, 1992 (pp. 103–113). (Computer search abstract only enclosed.).
Kostyukovskii, V.A. et al., Evaluation of digestibility of substrates and biosynthesis of protein by anaerobic fungi in the rumen from the accumulation of formate. *Byulleten' Vsesoyuznogo Nauchno–issledovatel'skogo Instituta Fiziologii, Biokhimii i Pitaniya Sel'skokhozyaistvennykh Zhivotnykh*, No. 1 (97) 1989 (pp. 74–77). (Computer search abstract only enclosed.).
Ellis, J.E. et al., Formate and glucose stimulation of methane and hydrogen production in rumen liquor, *Current Microbiology*, vol. 20, No. 4, 1990 (pp. 251–254). (Computer search abstract only enclosed.).
Mukhamedyanov, M.M., Effect of silages preserved with formates on productivity of, and rumen digestion in heifers, *Khimiya v Sel'skom Khozyaistve*, vol. 23, No. 7, 1985 (pp. 34–36). (Computer search abstract only enclosed.).
Mukhamedyanov, M.M., Use of formates for preserving green feeds, *Khimiya v Sel'skom Khozyaistve*, vol. 22, No. 7, 1984 (pp. 47–51). (Computer search abstract only enclosed.).
Mukhamedyanov, M.M., Sodium formate in diets for finishing young bulls, *Khimiya v Sel'skom Khozyaistve*, vol. 22, No. 3, 1984 (pp. 51–53). (Computer search abstract only enclosed.).

*Primary Examiner*—Frederick Krass
*Attorney, Agent, or Firm*—Harris, Tucker & Hardin, P.C.

[57] ABSTRACT

A chemical enhancer for ruminant animal digestion of organic matter roughage is presented, the addition on a ppm based of total feed ration of one or more formate salts to the ruminant diet improves or enhances the digestibility of low digestible roughage allowing the treated roughage as a substitute for more traditional and expensive feed rations such as alfalfa hay without loss of energy available to the animal. The use of formate salts in the ppm range based on total diet increases the anaerobic microbial activity thus enhancing digestibility rather than just enhancing the availability of dissolved organics and can be utilized in feedlot roughage rations for improved weight gain, range cattle weight maintenance and milk production for mother cows, dairy roughage diets providing milk production in a safe and an environmentally friendly methodology to both meat and milk production.

19 Claims, 4 Drawing Sheets

DIGESTION ENHANCER FOR RUMINANT ANIMALS COMPRISING A FORMATE SALT

BACKGROUND OF THE INVENTION

1. Field of the Invention

The present invention relates to a new and useful anaerobic digestion enhancer for ruminant and pseudo ruminant digestion of organic matter roughage and thereby increases the energy available for utilization by ruminant animals. In another aspect, the invention is concerned with the promotion of microbial growth within a ruminant anaerobic digestion system through use of formate salts in combination with organic matter roughage feed rations. In yet another aspect, the invention relates to a method for promoting digestion utilization by ruminant or pseudo ruminant animals of organic matter roughage such as cellulose based materials through addition of formate salts in the ppm range of the feed ration.

2. Description of the Prior Art

Organic matter roughage such as crop residues consisting of cellulosic based waste materials such as straw, corn fodder, cotton waste, gin trash, peanut shells, natural grass land forage, mature hay products, saw dust and the like offer a significant potential feed resource for ruminant and psuedo ruminant animals. Feed lots, dairy herds, cow calf range operations, wildlife and game cultivation utilize these feed ration sources either in part with grains or in total as the only energy source. In agricultural operations, for each pound of corn, wheat, milo or other grains, there is left a cellulosic residue of about one pound. In addition to is stubble, other high production waste biomasses such as gin trash are commonly available in various parts of the world where agricultural productivity generates cotton, grain and the like. Various amounts of these residues are presently being used in animal feed and by grazing of fields. However, the utilization of the cellulose fraction of these materials is minimal because of difficulties ruminant animals have in digesting these roughage materials.

It is well-known that ruminants utilize nitrogen and starch barring materials for the production of beef and other meat products as well as in dairy products. For example, food sources commonly used in these applications can be found in the group consisting of corn, sorghum, barley, oats, wheat, rice, millet, hay, silage, potatoes, yams, root, turnips, rutabagas, corn starch, potato starch, wheat starch, starch bearing foods and the like. However, the by-products generated in the production of these various food sources are commonly disregarded with the exception of hay products and silage. Cellulosic based waste materials such as stalks, gin trash, corn cobs and low quality overgrown forage products cannot be utilized fully by the ruminant animal.

These cellulosic waste such as straw, corn fodder, cotton waste, peanut shells, saw dust and the like are highly lignified biomasses which are digested poorly, if at all, by ruminants. For example, wheat straw is only about 30–40% digested by ruminants as compared to 50–60% for conventional foliage such as alfalfa and 80–90% for grains. Some of these cellulosic waste, for example, cotton gin trash are useful only for burning, having a zero or minimum economic value in feed applications.

For years the barrier to the economic utilization of cellulosic waste has been assumed to be the lignin barriers which are responsible for low ruminant digestibility of the digestible cellulose fraction. For the most part, research and prior art approached the increased utilization of cellulosic waste by attacking or providing approaches for delignification. Once lignin is broken down by treatment such as alkaline hydrogen peroxide the result is a cellulosic residue which can be more readily digestible by the ruminant. The problem in the utilization of these chemical treatments is both a logistic as well as an environment issue. Thus while cellulosic wastes are readily available on dispensed farm locations they represent bulky materials having expensive transport costs. Transportation and treatment of such waste in centralized chemical processing facilities is uneconomical and even processing such as complex chemical predigestion of lignin is not economically desirable. Moreover, many of the chemicals utilized in breaking down the lignin complex are expensive and their residuals can upset the anaerobic digestion systems of ruminant animals.

Presently, most available information on the roughage digestion by ruminants animals has been generated through chemical pretreatment processes designed to disrupt the ligno-cellulose structure of the roughage or otherwise degrade the lignin faction that shields the digestible cellulose. While some approaches have shown promise for significantly enhancing the digestibility of low grade roughage, the application in practice has been limited by cost effectiveness. Typically, the chemicals used in the pretreatment are expensive and since these chemicals are required in considerable volume, the overall process becomes too costly for utilization. For example, a method for conversion of comminuted cellulosic agricultural waste to a formedible by ruminant animals is achieved through treatment of such waste by spraying with an aqueous solution of a mixed oxidant gas at a pH of about 11–12, to produce a water content of less than 40% and a pH of about 11.4 to 11.7 in the waste is taught by Sweeney, U.S. Pat. No. 5,032,239. This approach teaches the production of the mixed oxidant gas by a gas generator comprising an electrolytic cell.

The literature contains a rich history of methods and processes designed to improve digestibility of roughage. G. C. Fahey, Jr. (1991) and colleagues at the University of Illinois have published extensively on the use of alkaline hydrogen peroxide as a means of chemically pretreating a variety of different roughage. Others have extensively investigated ozone pretreatments of roughage; use of sodium chlorite as a chemical reagent for the pretreatment of animal feedstuffs and the like. C. R. Richardson and colleagues at Texas Tech University have published and undertaken a variety of research projects pertaining to the use of chemical pretreatments of roughage enhancement. Overall, the Departments of Animal Sciences and Chemical Engineering at Texas Tech University have endeavored to promote an interdisciplinary, cooperative research program directed at the enhancement of roughage produced in West Texas for ruminant diets. The premise at Texas Tech University has been that the typical roughage is an abundant, low density biomass which usually contains less than about 50% holocellulose. Hemicellulose and amorphous cellulose are both digestible by ruminant animals and can make up much of the holocellulose in most biomasses. The problem is that for the typical roughage, the fraction of the biomass that is digestible cellulose is usually not available to the digestive process of the animal. Thus, the in vitro coefficient of digestibility for a specific roughage may be less than 15% while the fraction of potentially digestible cellulose in the same biomass exceeds 50%. The explanation offered in such cases centers on the lignin binder found in plant tissues. The lignin content of roughage is hypothesized to effectively shield the digestible cellulose content from the digestive process. The most obvious solution for increasing digestibility, therefore has been to diminish or destroy the shielding ability of the lignin. This can and has been accomplished by any number of mechanical-chemical processes.

During the 80's several processes for the enhanced hydrolysis of cellulose found in agricultural residues where proposed wherein the goal was to increase the amount of fermentable sugars obtained from biomass which would then be used in production of fuel grade ethanol. These studies reported that mechanical grinding of biomass to a flower reduced the lignin's ability to shield cellulose. Size reduction can be accomplished by any number of comminution processes. However, the grinding of bulk biomass to such a small size (less than 60 mesh) can be expensive. Further, with respect to ruminant animals, the reduction to such small particle size also dramatically reduces the retention time of the biomass in the animals G.I. tract. Thus, what was once represented as a cheap biomass roughage may no longer be cost effective in the finely ground state and more importantly the powdered biomass will have lost the fibrous characteristics needed for retention and stimulation of the ruminant wall.

Chemically orientated pretreatments of roughage have also been utilized. Thus, when different alkali hydroxide solutions also were added to the roughage it was found that with the caustic solution increased swelling of the biomass and resulted in a partial solubilization of the lignin fraction achieved by higher pH levels. The use of ammonium hydroxide instead of a mineral alkali has also produced some successes. However, ammonia is more expensive reagent than mineral hydroxides. Ammonia also presents problems due to losses from volitization in the low pH range. In a slightly different approach, the addition of solutions of low cost mineral acids to the biomass has been shown to induce cellulose hydrolysis which releases the more soluble sugar monomers. As solutes, these simple sugars are more readily extracted from the lignin complexes. However, the amount of water required to swell the biomass structure with either the caustic or acid treatment is large, greater than 50% on a weight basis. It should be further noted that the digestive tract of ruminant animals is intolerant of the extremes of pH needed with caustic or acid treatments to produce significant changes in the digestibility of the biomass roughage. Hence, while feedlot applications of these caustic and acid pretreatment processes have been attempted, the large scale implementation in cost effectiveness have not been proven and their usage has not received wide spread commercial development.

More recently, the use of chemical oxidizers has been shown to be effective as a pretreatment process for increasing the digestibility of roughage. The more effective oxidizers have been hydrogen peroxide, ozone and hypochlorides. Except for ozone which is a gas of limited water solubility, these oxidation reagents are highly water soluble and can be applied as aqueous solutions. Published research results, Tock (1982), indicate, however that these chemical oxidizers preferentially react with a lignin faction. One problem with this approach is that these reagents are expensive and when used, even in moderate quantities, can make the low cost roughage too expensive for use in formulating cattle feeds. Moreover, the processing equipment needed to contact significant quantities of these oxidizers with the roughage is somewhat more complicated due to their increased reactivity and by the requirement that these chemicals must be safely stored or generated on site. Thus, while the results look promising, there is no complete understanding of the cost involved nor of the animals digestion process for roughage pretreatment with such chemical oxidizers.

These respective approaches and techniques along with their various difficulties promoted the need for a simple, economical, environmentally safe and ruminant safe enhancer for ruminant or pseudo ruminant digestion of organic matter roughage. An approach was required which did not destroy a significant portion of the biomass lignin nor to even reduce its shielding effects but to some how prepare the roughage biomass for biological degradation in the rumen.

It can be seen that for improved economy, environmental safety and safety to the ruminant animal, a treatment which increases the digestibility coefficients achievable with low level chemical enhancer pretreatment of cellulose based roughage can, after treatment, be utilized as a larger fraction of the total feed ration of ruminant or semi ruminant animals. Not only is roughage pretreatment available for feedlot industry purposes but also for ruminant or pseudo ruminant animals where these animals are consuming low quality range plants. The feedlot operator, the range cattle/sheep operator, the dairyman will be able to experience increased flexibility in the variety of roughage available for diet formulations and still experience increases in overall total cost effectiveness and feed efficiencies while maintaining high animal energy levels either for maintenance, production of weight gain or milk. It would be most beneficial to the feedlot operator, rancher, wildlife manager, dairyman and the like if such an enhancer can be made available either as a premix for mixing with roughage, a control release salt or mineral supplement block sources for ranch animals, wherein the enhancer is only required at a level of about 100 ppm of total feed ration or greater. The enhancer can be stored locally, is environmentally friendly and promotes anaerobic digestion found in the ruminant. Such an enhancer based on formate salts has been found to satisfy all the requirements of economics and safety including the safety to the ruminant system while promoting a substantial increased utilization of the food value of cellulosic based roughages by the ruminant animal.

SUMMARY OF THE INVENTION

Formate salts are added to the roughage fraction of the feed for cattle or other ruminant or pseudo ruminant animals (hereafter ruminant) or supplied to ruminant animals grazing on range grass and the like in amounts of 100 ppm or greater of the total feed ration. The formate salts can also be produced insitu by addition of formic acid and various bases such as sodium hydroxide, potassium hydroxide and the like. The addition of these organic salts have been shown to enhance the digestibility of cellulosic based roughage from approximately 25% to as much as 40% in vitro. Cattle or other ruminant animals supplemented with formate salts can convert a greater fraction of the energy in their feed to maintenance or to weight gain as well as increased milk production. For the feedlot industry this also means that a lower cost of gain ratio can be achieved therefore an economical advantage can be realized. Atypically low levels, for example sodium formate, of about 100 ppm or greater are needed to produce this enhancement in digestibility; although larger additions of the formate salts were observed to produce even higher digestibility. The higher concentrations however, make the process less cost effective. The addition of sodium formate or other formate salts or mixtures of formate salts such as potassium formate, calcium formate, ammonium formate and the like, accomplishes enhancement of the anaerobic digestion found in the rumen. The formate ion as a food source promotes microbial growth while simultaneously the formate salt buffers the ruminant fluids at the correct pH level for optimum anaerobic activity. The formate promotes early hydrogen production instead of methane and triggers enzymatic activity to break down the biomass in the feed ration. The addition or use of formate is a safer and more environmentally friendly approach than the prior chemical pretreatment approaches which were designed to destroy the lignin's shielding effects or assist in hydrolysis of cellulose by use of strong oxidizers, acids and/or bases. The use of formate salts is novel in that the use enhances anaerobic microbial activity and thereby enhances digestibility, rather than just enhancing the availability of dissolved organics as other roughage pretreatments seek to do.

The concept of utilizing only a formate salt or salts such as sodium formate in enhancing ruminant digestion of cellulosic based roughage is unique. For purposes of this disclosure, the terms cellulosic material and cellulose base roughage are defined to include ligno-cellulose, raw cellosic materials and treated cellulose such as paper products and other cellulosic waste. The reagent (formate salts) need not be generated on site, but can be stored as a stable, solid powder until needed. The formate salts can be added to the feed rations either as a dry powder with a carrier or as a formate solution in which the salt is added at a concentration range of about 100 ppm to less than about 10,000 ppm. Based on the roughage the following biochemical activities occur.

Sodium formate at 100 ppm and higher concentrations;
a. Enhances the anaerobic digestion found in the rumen.
  1. The formate ion as a food source promotes microbial growth.
  2. The sodium formate helps buffer the ruminant fluids at the correct pH level for optimum anaerobic activity.
  3. The formate promotes early hydrogen production instead of methane.
b. Assists in transfer of essential micro nutrients (trace minerals).
c. Triggers enzymatic activity to breakdown the biomass in the feed.
d. Dilutes the effects of phenolic digestion inhibitors in the biomass.

The resulting increases in the digestibility coefficients achieved with the low level formate salt pretreatment processes shows that gin trash and other similar low grade roughage can, after treatment, be utilized as a larger fraction of the total diet for ruminant animals.

When the goal of the pretreatment process or the use of an enhancer is to generate on improved roughage and/or improved digestibility in the ruminant diet; then the treatment process and/or the enhancer need not be so severe as when an enriched cellulose source is sought for an enhanced fermentation process. With roughage enhancement, the digestive process of the ruminant animal can effectively extract energy from treated roughage if provided the opportunity is most desirable. Moreover, with a roughage it is especially important to preserve the fibrous nature of the biomass so that it can stimulate the digestive processes in the ruminant; therefore formate salts provide the digestive enhancement for ruminant animals without upsetting the normal functionality of the normal ruminant animal biomass diet.

Utilization of formate salts in accordance with the invention as digestion enhancers, increased by as much as 25% the digestibility of roughage in ruminant diets by the ruminant animal. The addition, of, for example, sodium formate at levels from about 100 ppm to 1000 ppm or greater in the total diet have been found to be most effective. It is hypothesized that the sodium formate: (1) enhances the growth of anaerobic methanogens by providing interspecies electron transfer and direct formate utilization; and (2) provides buffering capacity and retards the onset of acidosis. Cattle feedlots using roughages in the diets can utilize cheaper low quality roughages such as gin trash pretreated with sodium formate as a substitute for more traditional and expensive alfalfa hay. This substitution can be achieved without loss of energy available to the animals. Although the improvement in digestibility is most dramatic with low quality roughages, smaller gains and digestibility of other components of the ruminant animal feed rations are apparent.

The use of formate enhances the biochemistry in the anaerobic rumen by providing both an essential chemical reagent (formate) and through buffering effects. Other chemical pretreatment approaches attempt to destroy the lignin shielding effect or assist with hydrolysis of cellulose by the use of strong oxidizers (acids) and/or bases. Hence, the addition or use of formate is a safer and more environmentally friendly approach. It is novel in that the use of formate is used to increase the anaerobic microbial activity and thereby enhance digestibility, rather than just enhance availability of dissolved organics.

DETAILED DESCRIPTION OF THE INVENTION

The main agents essential for the utilization of cellulosic materials by the ruminant are certain species of anaerobic bacteria that inhabit the rumen. These mixed microbial bacterial species produce cellulase enzymes which hydrolyze the insoluble cellulose to soluble cellulodextrins and/or sugars. Some of which they absorb and ferment to obtain the energy required for growth. The final products of ruminant fermentation of cellulose such as acetate, propionate, butyrate, carbon dioxide, methane and microbial cells are not produced by cellulolytic species alone but rather by a complex interacting population of species. Included in this interacting population mix are the cellulolytic species; other carbohydrate-fermenting species. Species that degrade compounds such as succinate and formate and in some cases lactate formed by the carbohydrate-fermenting species. In addition, methanogenic bacteria are present which obtain energy for growth by reducing carbon dioxide to methane, utilizing hydrogen gas or formate produced by other species as the electron donor. Digestion of cellulose in the ruminant animal involves effective interaction of these bacteria with the non cellulolytic species.

The efficiency with which ruminant cellulolytic bacteria digest the cellulose of plants depends on many factors besides the nutritional requirements of the bacteria. The chemical characteristics of the cellulosic materials such as the amount of associated lignin and silica are of great importance. Assuming that the cellulose is potentially available for degradation, a number of other factors become important such as the physical form of the cellulosic diet. If materials are finally ground, it may pass out of the ruminant to rapidly: salivation and rumination may be impeded with resultant lowering of ruminant pH. Both the rapid passage and lowered pH will lessen the digestion of cellulose.

At least one or a mixture of formate salts can be used to enhance the digestibility of cellulose based roughage by ruminant animals. Because relatively small quantities of the formate salts are used, formate salts and processing cost of the proposed chemical pretreatments make the treated roughage competitive with alfalfa hay; the standard roughage used in West Texas feedlots. On-going feedlot trials utilizing sodium formate, for example, have been found successful. Thus, allowing more flexibility in the choice and fraction of roughage utilized for ruminant diets.

Ruminant diets can contain a rather broad range of roughage fractions and types, and feedlots where animals are being fattened for market from 5–15% of the diet will consist of a roughage usually alfalfa hay. Alfalfa hay became a standard roughage used in feedlots because of its wide availability, relatively high organic digestibility (55%) and a potentially high crude protein level. No other roughage approaches these characteristic levels. Hence, even at a typical fraction of 10% of the total diet, alfalfa still contributes to the available energy in the diet of ruminant animals. Good quality alfalfa hay can command premium prices which may exceed the current feed grain prices on a mass basis.

An additional benefit derived from the use of alfalfa hay or any other roughage at 15% or less in the diet is its fiber fraction. The fibers presence can stimulate the gastrointestinal processes of the animal so that the overall feed efficiency is increased. The stimulus is thought to be a physical-chemical synergism which arises from the interaction of the fibrous constituents with the ruminant wall. In many feedlot diets, the use of other abundant and cheaper fibrous biomasses such as cotton seed hulls, grass hay, grain stovers, gin trash and the like instead of the more expensive alfalfa hay frequently can be justified on a cost effectiveness basis. During the cotton harvest in West Texas gin trash is relatively cheap and is frequently substituted for alfalfa hay as a roughage used in the feedlot. At a level of 10% or less in the diet therefore the low cost gin trash even with its lower organic matter digestibility (OMD less than 25%) and minimum protein level can on a Cost: Gain basis out perform the same diet which instead utilizes 10% alfalfa hay as a roughage.

In many other instances, the fraction of roughage in the diet will exceed the 10% level. For example, non feedlot animals such as dairy cows or young livestock under 300 pounds do not require the high energy level diets typical of the finishing feed lot. The diets for these animals may contain as much as 60% roughage, the exact upper limit of roughage used in the diet depends greatly upon the contribution made by the roughage to the total energy available to meet the animal's needs. Hence, as the fraction of the roughage in the diet is increased, its contribution to the energy demands of the animal must also increase. If the usable energy contribution made by the roughage does not increase, maintenance of the animal becomes difficult or impossible. The animal simply cannot ingest enough low density, low digestible material to keep pace with its own energy demands and ward off the onset of starvation. Under these circumstances, the level of cheap, low digestible roughage added to a diet becomes limiting. One method of overcoming this restriction is to improve the digestibility of the low quality roughage so that its contribution as energy is increased.

In addition to the cellulosic feed compositions comprised of moisture and dry matter with moisture supplied as water, other dry matter can be feed comprised of organic matter and inorganic matter with the organic matter components:
1. Carbohydrates
   soluble sugars
   poly saccharides
      1. starch: glucose units $\alpha$ 1 1,4 bonds
      2. cellulose: glucose units $\beta$ 1,4 bonds
      3. hemi cellulose: 5 carbon sugars
      4. lignin: radicals without definitely defined structures;
2. Proteins
   essential amino acids
   nonessential amino acids;
3. Fats
   saturated
   unsaturated;
4. Vitamins;
Inorganic matter components:
   1. Macro minerals
   2. Trace minerals.

Formate salt enhancers will be effective not only with cellulosic matters but also in the ruminant digestion of all organics including carbohydrates, proteins, fats and the like.

Most of the tests which are presented were performed on locally produced cotton gin trash which had been rough ground and screened; however, one test series was undertaken on a coastal bermuda grass hay. In the majority of the tests, small samples of the biomass (less than 1.0 kg) were contacted with aqueous solutions of the selected chemical reagent ie. formate salts and care was taken so that the moisture content of the treated material did not exceed 20%. Above the 20% moisture level, mold sometimes developed overnight on samples exposed to the ambient air. In order to quantify the effectiveness of a particular treatment process, the treatment materials were subjected to a series of tests. These included in vitro measurements of digestibility (Moore modification of the Tilley-Terry method) and measurements to determine the level of total organic carbon (TOC) in aqueous extracts of these treated materials. In most instances, the measured in vitro digestibility of the roughage was found to be the best indicator of the materials performance in an animal diet.

Then intention of most biomass pretreatment processes, as discussed, is to enhance the separation of the cellulose fraction from the lignin binder. However, when the goal of the pretreatment process or the enhancement process is to generate an improved roughage, one which can more readily be digested as part of the ruminant diet, then the treatment process need not be so severe as when an enriched cellulose source is sought for an enhanced fermentation process. When the roughage has been treated for enhancement of digestibility, the digestive processes of the ruminant animal can effectively extract energy from the treated roughage if provided the opportunity. Roughage when combined with digestion enhancer preserves the especially important fibrous nature of the biomass so that the biomass can stimulate the digestive processes in the rumen.

In the studies which support the present invention, the bovine was the primary target animal. The bovine digestive system is anaerobic. Hence, the chemical pretreatment or chemical insitu treatment used in accordance with the invention was designed to enhance the roughage digestibility in an anaerobic digestion process. Experience suggest that the animal's anaerobic digestion process can tolerate significant levels of volatile acids, but is somewhat intolerant of chemical digestion inhibitors. If the volatile acids are not present in the roughage or diet, then they must be produced as a priori starting condition for anaerobic digestion. In the use of oxidation pretreatments, problems can arise in an over production of soluble acids from too much chemical oxidation. When this occurs the pH level can fall below a pH of less than 6.4. In order to eliminate potential pH problems, sodium formate or formate salts can be added to the pretreatment solution even when utilizing chemical oxidation procedures. The sodium formate is the salt of a strong base and weak acid and acts as a buffering agent during the pretreatment process. As a part of the pretreated roughage, the sodium formate is carried over into the diet and acts as a buffer for fluids in the rumen after being ingested. Formate salts, sodium formate and the like, have been found not only to provide pH buffer but to also enhance anaerobic digestion in the rumen without need of the chemical oxidation process. The formate salts provide enhanced digestion of cellulose while simultaneously providing buffering capacity if the rumen to maintain the pH at above about 6.5 and below about 7.8. The method of the present invention allows for decreases in feed to gain ratio of at least 2 percent or greater, preferably 5 percent or greater, and increases in milk production of at least 2 percent per day per cow, preferably 5 percent or greater. Thus, the core of the present invention is the sodium formate or other formate salts used singly or in combination with other formate salts as an enhancer for ruminant digestion of cellulose based roughage when present in amounts of from about 100 ppm or greater based on the mass of roughage.

Anaerobic gas production ie. conditions for the maximum production of methane do not necessarily correlate with an optimum energy utilization of the diet by the animal. Thus, carbon converted to methane represents a carbon intake loss to the animal. Similarly, mineral requirements of the animal and the mineral's actual bio availability in the diet can vary considerably. Biomass roughage feed rations have frequently been found to be lacking in the macro-minerals calcium and phosphorous. The levels of calcium and cotton gin trash produced in West Texas is often equal to that found in alfalfa and grass hays. The mineral content of even the same types of roughage can vary significantly depending on the source of the roughage. For this reason, it is recommended that all biomass roughage should be tested for mineral content, with deficiencies being corrected through mineral additions of formate salts to the total diet.

Ruminants have the most differentiated, specialized and complex stomach among all the mammals. Of the 142 species distinguished by Simpson (1945) only about twelve-sheep, goats, cattle, llama, alpaca, dromedary camel, bactrian camel, water buffalo, yak, banteng, gaur and reindeer—have been domesticated. Wild or domestic, ruminants have the collective advantage of a rumen inhabited by microbial symbionts which ferment cellulose and hemi-cellulose and synthesize amino acids, vitamin K and B-vitamins. These phenomena are essential features of the adaptation of wild ruminants to their natural environment and are of major significance in managing these species in captivity. Despite this common feature, natural dietary habits of ruminants in the wild differ appreciably. However, wild or domestic ruminants will benefit from the formate salts enhancers when supplied in addition to a diet rich in cellulose roughage.

| Species | Level | Comments |
| --- | --- | --- |
| White-tailed deer | 92–98 g/kg$^{0.75}$ | Intake from September through November |
| | 54–61 g/kg$^{0.75}$ | Intake during February through April |
| White-tailed deer | 3.5 lb/day | Adult does, winter, pelleted ration |
| White-tailed deer | 3 lb/day | Ad lib intake rate, adult deer, winter |
| | 4.5–6.5 lb/day | Ad lib intake rate, adult deer, summer |
| Black-tailed deer | 2.85 lb/100 lb BW | Captive deer, winter |
| Mule deer | 31 g/kg/day | Fawns, summer |
| | 32 g/kg/day | Fawns, winter |
| | 21 g/kg/day | Yearling and adults, summer |
| | 17 g/kg/day | Yearling and adults, winter |
| Mule deer | 2.5–3 lb/day | Wild deer, ad lib, winter, pelleted ration |
| Bison | 3.5–4.5 lb/100 lb BW | Estimate for free ranging animals |
| Elk | 22.7 g/kg BW | Free ranging elk, late gestation requirements |
| Elk | 4.47 lb/100 lb BW | Short term ad lib intake, pelleted alfalfa |
| | 3.51 lb/100 lb BW | Short term ad lib intake, baled alfalfa |
| Moose | 10 kg/day | Cow moose, Canada |
| | 6.7 kg/day | Calf moose, Canada |
| | 14.5–18.6 kg/day | Fresh weight of balsam fir, captive bull, Canada |
| Moose | 1.7–3.4 kg/day | Alaska, winter |
| | 17.6 kg/day | Alaska, summer |

In Vitro Digestibility

The determination of the coefficient of in vitro digestibility represents a standard procedure by which feed stuffs can be ranked. The larger the coefficient, the more digestible the material and theoretically the more energy available for conversion by the ruminant animal. Therefore, both untreated and treated gin waste, and untreated and treated grass hay were subjected to digestibility measurements. The untreated materials were used as the control for comparison with the same materials pretreated with a sodium formate solution. Example data of the digestibility are presented in Tables 1 and 2.

TABLE 1

In Vitro Digestibility of Gin Trash Treated With Sodium Formate Solution

| Treatment | % Dry Matter | % Ash | % DMD [48 hr] | % OMD [48 hr] | % DMD [96 hr] | % OMD [96 hr] |
| --- | --- | --- | --- | --- | --- | --- |
| Untreated | 91.2 | 11.5 | 19.5 | 21.4 | 28.6 | 33.8 |
| 100 ppm HCOONa | 85.4 | 10.1 | 23.5 | 25.8 | 33.2 | 38.4 |
| 1,000 ppm HCOONa | 81.4 | 10.6 | 26.2 | 28.7 | 33.9 | 39.9 |
| 10,000 ppm HCOONa | 80.6 | 11.6 | 27.9 | 31.0 | 34.6 | 41.4 |

Average range errors in listed digestibility values was 9.5%

The percent Dry Matter column in Table 1 reflects the addition of sodium formate solution. The total moisture level was targeted to be less than 20% whenever possible in order to discourage microbial activity following treatment. The 96 hour organic matter digestibility (% OMD) column shows a 20% increase in digestibility over the untreated gin trash. However, a 14% increase was produced after the addition of solution containing the lowest concentration of sodium formate (100 ppm). Hence there is a diminishing effect from the increased use of additional sodium formate, both in terms of cost and increased digestibility.

Table 2 shows the same type of data for the Bermuda grass hay. In this instance sodium formate was used both alone and with ozone. Replicates are given to indicate the level of deviation in the data. Based on the 96 hour digestibility, the formate pretreatment gave a 13% increase in digestibility.

TABLE 2

In Vitro Digestibility of Coastal Bermuda Grass Hay Treated With Sodium Formate

| Treatment | % Dry Matter | % Ash | % DMD [48 hr] | % OMD [48 hr] | % DMD [96 hr] | % OMD [96 hr] |
|---|---|---|---|---|---|---|
| Untreated | 93.3 | 8.22 | 36.3 | 38.0 | 45.4 | 48.4 |
| Untreated | 93.3 | 7.81 | 44.2 | 46.3 | 48.8 | 51.1 |
| 5,000 ppm HCOONa | 71.8 | 6.36 | 49.3 | 51.5 | 56.7 | 57.9 |
| 5,000 ppm HCOONa | 77.0 | 6.79 | 44.3 | 46.5 | 51.6 | 54.6 |
| 5,000 ppm HCOONa and Ozone | 75.8 | 6.41 | 48.7 | 50.7 | 54.9 | 56.1 |

Figure 1:
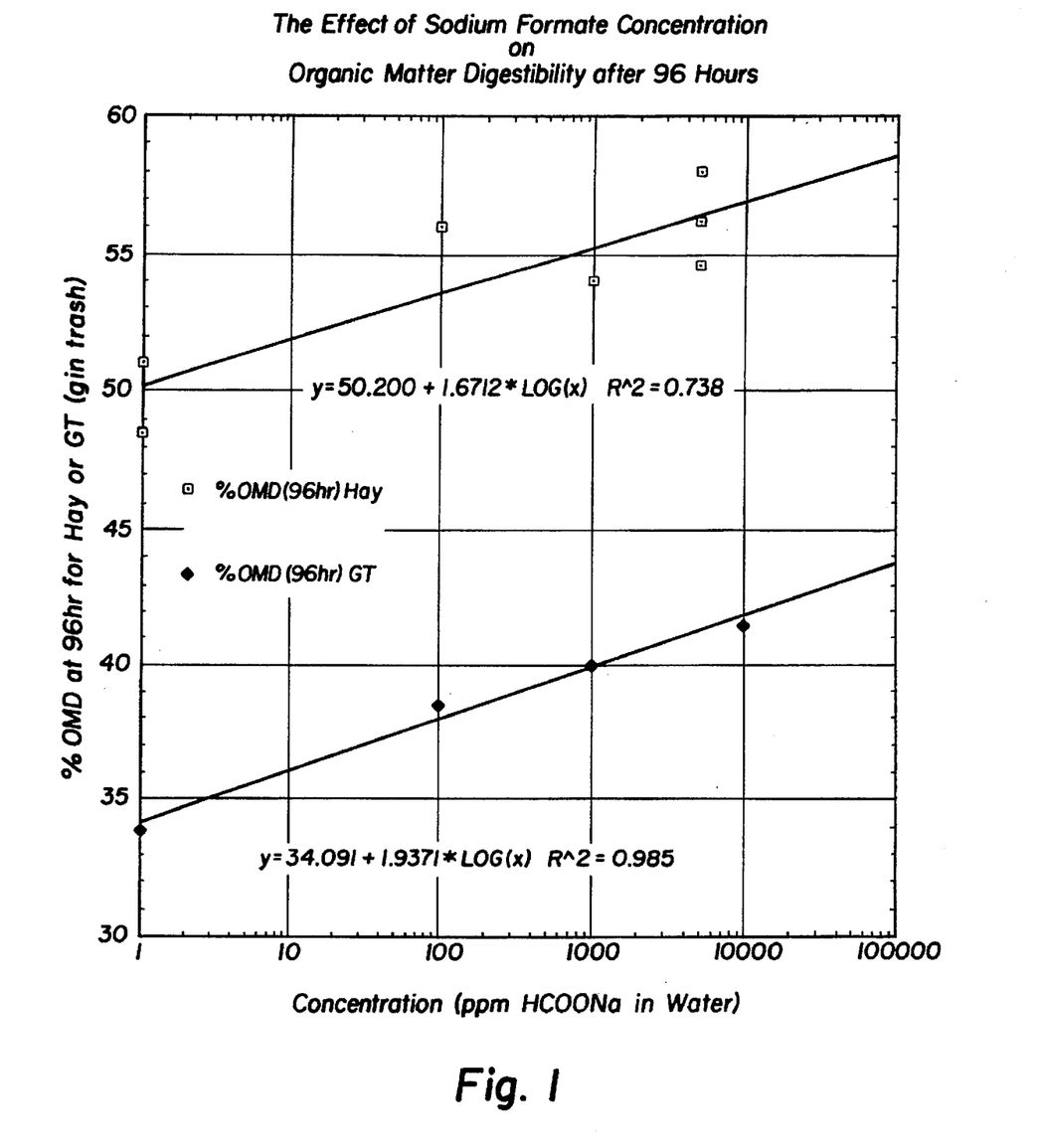
FIG. 1 is a graph showing the effect of sodium formate concentration on organic matter (hay and gin trash) digestibility after 96 hour by plotting % OMD at 96 hours vs. concentration (ppm HCOONa in water).
Figure 2:
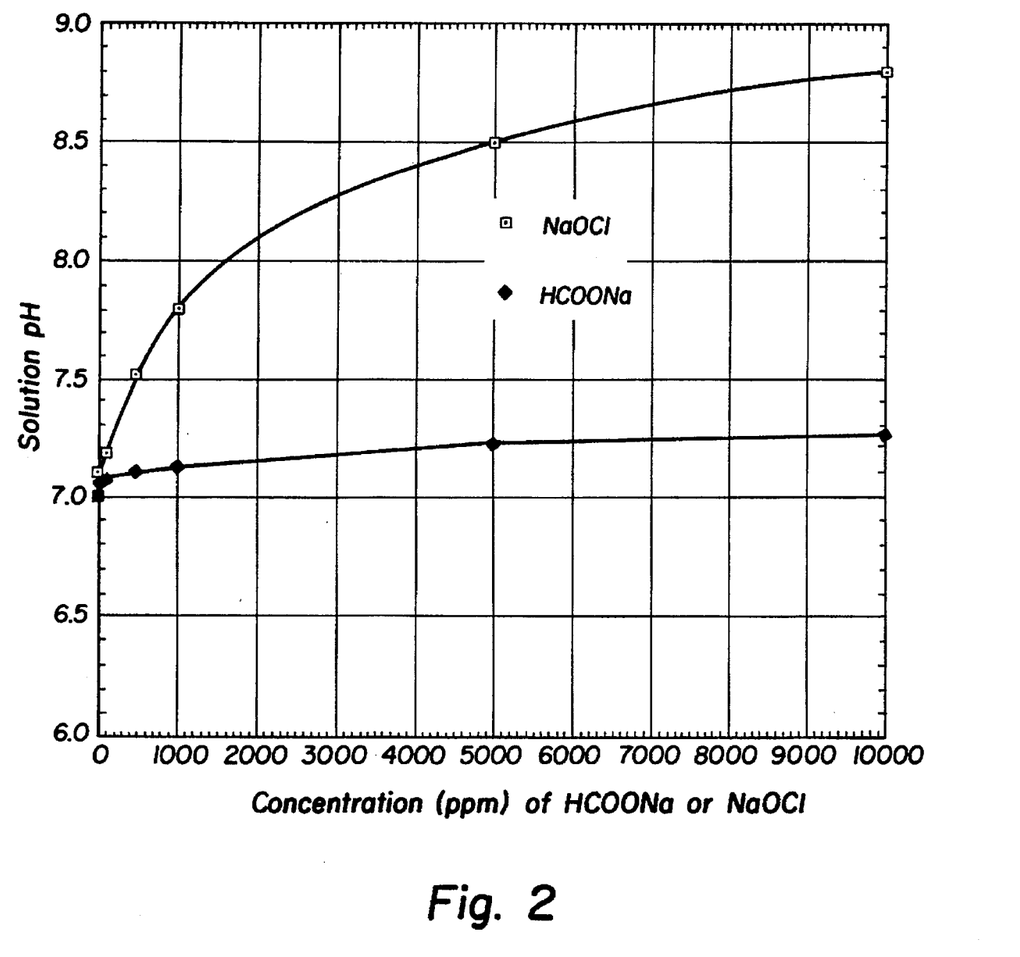
FIG. 2 presents a graphic comparison of the buffering effect on pH for solutions of sodium formate in accordance with the invention and a comparatitive animal feed treatment addition, sodium hypochloride which is outside the invention.

FIG. 1 shows a plot of the % OMD [96hr] data given in Tables 1 and 2 as a function of concentration for the solutions of reagent, sodium formate. Both gin trash and coastal Bermuda grass hay were treated. FIG. 1 was plotted with a logarithmic scale. When concentration is plotted on a linear scale (FIG. 4), however, the resulting nonlinear curve suggests that the relative increase in digestibility caused by the chemical pretreatment begins to diminish for concentrations above 1000 ppm. This level, 1000 ppm, became an important design parameter for the upper bound on later treatment processes. Furthermore, for these figures, the intercept of the Y axis is a rough indication of the digestibility coefficients for untreated gin trash and the untreated grass hay. For FIG. 1, the OMD intercept of 50% is typical of grass hays. However, the 34% OMD intercept for gin trash on the same figure is atypically high. An intercept of OMD=23.5%, is more representative of the general run of untreated gin trash. The higher 34% OMD level is, therefore, reflective of a better source of raw gin trash which used in a portion of the tests. Finally, the slopes for the regression curves of the data in FIG. 1 are positive. A positive slope indicates that an improvement in digestibility occurred with both gin trash and grass hay after pretreatment with a solution of sodium formate.

Figure 3:
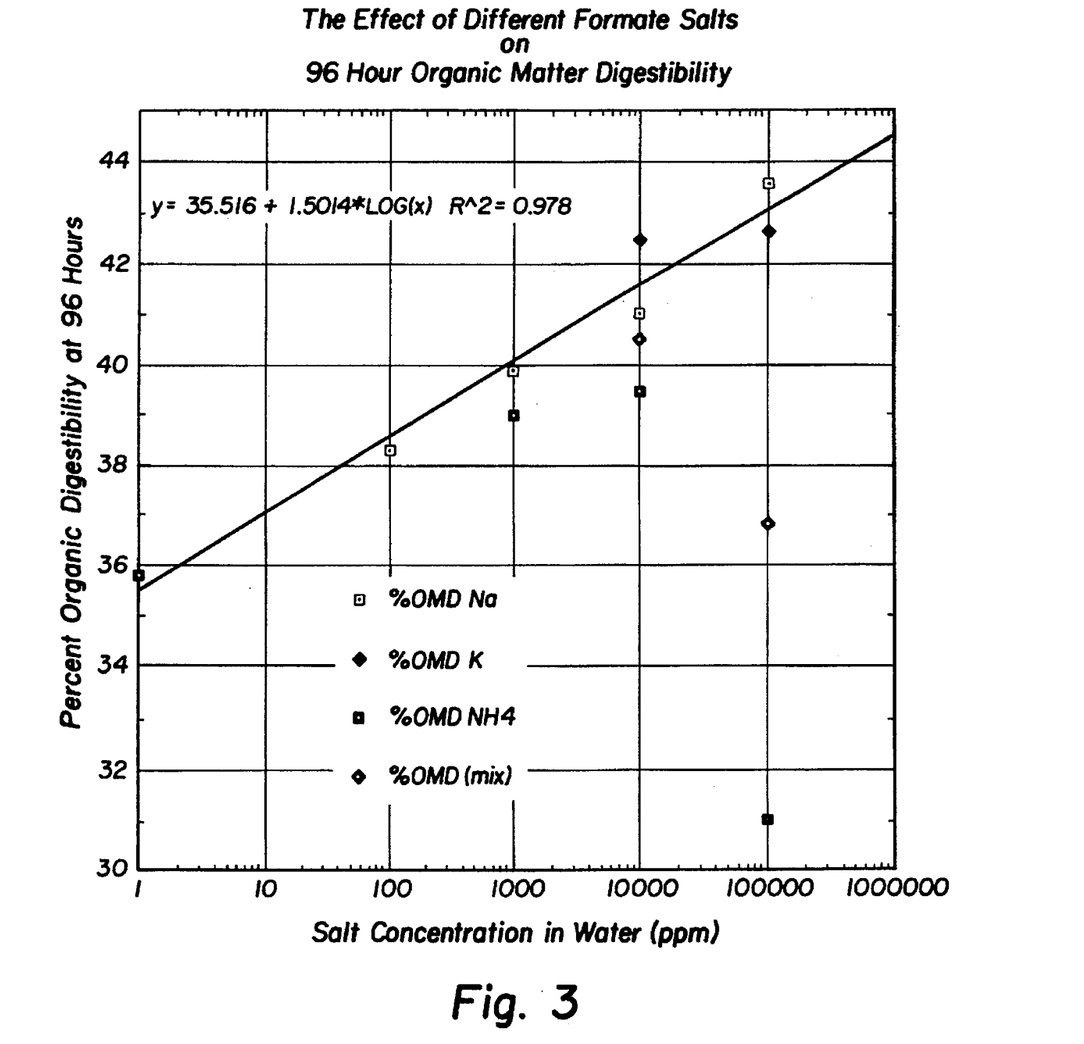
FIG. 3 presents a graphic comparison of the effect on in vitro organic matter digestibility of gin trash treated with sodium potassium, ammonia or mixtures of salts of formic acid (formate salts) over a range of $10^0$ to $10^4$ ppm in water.
Figure 4:
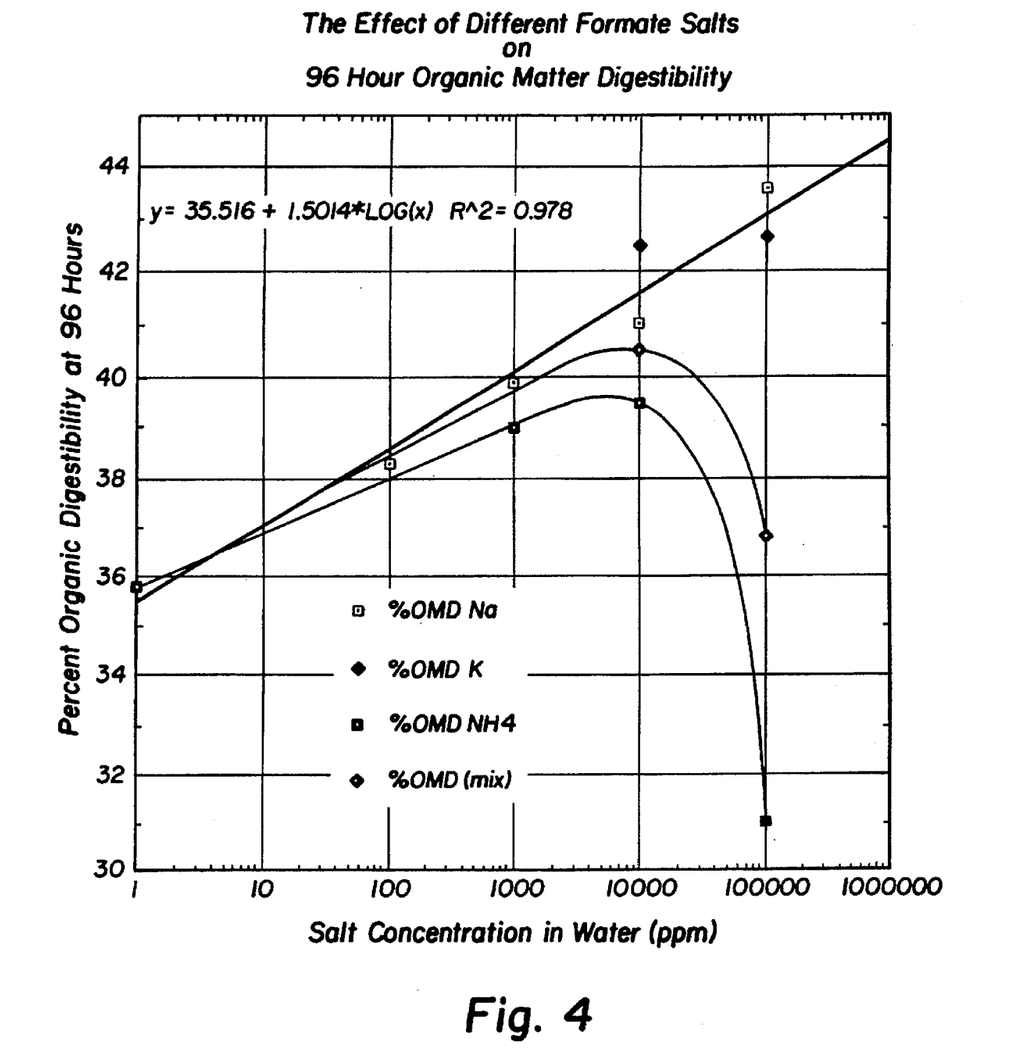
FIG. 4 presents a graphic comparison of the same data presented in FIG. 3 showing performance of each formate salt and a formate salt mix with the ammonia salt and mix producing a decrease digestibility at concentrations above 1000 ppm.

Table 3, FIG. 3, FIG. 4 and Table 4 are the data collected on titration effects for three different formate salts and mixtures of the three salts. Both sodium and potassium provided a positive response in 96 hour organic matter digestibility even up to the 10% level in the diet. The ammonium and mixtures containing ammonium appear to peak near 10,000 ppm (1% of the diet). The ammonia is probably converted to nitrate too rapidly and shuts down the anaerobic process.

TABLE 3

| ITEM | % DMD | % OMD |
|---|---|---|
| 10 g Gin Trash | 33.86 | 35.87 |
| 9 g Gin Trash + 1 g HCO$_2$K | 40.71 | 42.50 |
| 9 g Gin Trash + 1 g HCOONH$_4$ | 29.95 | 31.12 |
| 9 g Gin Trash + 1 g HCO$_2$Na | 42.19 | 43.61 |
| 8.5 g Gin Trash + .5 g HCO$_2$K .5 g HCOONH$_4$ .5 g HCO$_2$NA | 35.22 | 36.78 |
| 9.9 g Gin Trash + 0.1 g HCO$_2$K | 40.56 | 42.45 |
| 9.9 g Gin Trash + 0.1 g HCOONH$_4$ | 38.22 | 39.98 |
| 9.9 g Gin Trash + 0.1 g HCO$_2$Na | 39.09 | 40.39 |
| 8.5 Gin Trash + 0.05 g HCO$_2$K 0.05 g HCOONH$_4$ 0.05 g HCO$_2$Na | 38.60 | 40.07 |

TABLE 4

| Concentration | OMD (96 hr) Na | OMD (96 hr) K | OMD (96) NH4 | OMD (96 hrs) MI |
|---|---|---|---|---|
| 100000.000 | 43.610 | 42.500 | 31.120 | |
| 10000.000 | 40.390 | 42.450 | 39.980 | |
| 10000.000 | 41.410 | | | |
| 1000.000 | 39.950 | | | |
| 100.000 | 38.400 | | | |
| 1.000 | 35.870 | 35.870 | 35.870 | 35.870 |
| 150000.000 | | | | 36.780 |
| 15000.000 | | | | 40.070 |

Effects of a Rumen Anaerobic Digestion Enhancer on In Vitro Digestibility, Performance of Steers and Gestating Beef Cows Published data indicate that the digestibility of some roughages can be enhanced through chemical pretreatment. Most pretreatment processes are designed to disrupt the ligno-cellulose structure of the fibrous material or otherwise degrade the lignin fraction which shields the digestible hollo cellulose. The objectives of these studies were to determine the effects of RADEX™ (rumen anaerobic digestion enhancer, experimental). The tests were designed to assess in vitro digestibility; safety, feed mixing and handling; and performance of growing steers and gestating cows. In vitro dry matter and organic matter digestibilities of cotton gin trash were improved (P<.05) across three levels of the anaerobic digestion enhancer. A 60 day feedlot experiment with crossbred steers (310 kg, N=190) was conducted using a completely randomized design with three treatments, and two pens of 31 or 32 steers per replication. Steers were fed a diet containing 46% cotton motes and formulated to meet crude protein, calcium, phosphorus, and vitamin A requirements. The digestion enhancer was added as a dry premix or as a water-based solution. Average daily gain (P, .05) and feed:gain ratio (P<.02) were improved by either method of application over the control. However, adding the enhancer in the dry form resulted in larger improvements. Gestating Angus cows (N=32) were fed diets based on 80% millet hay or 80% cotton gin trash plus a concentrate, mineral and vitamin supplement those cows on the gin trash diet also received the digestion enhancer. Weight changes were similar across the two treatments after 28 days which was immediately prior to calving. In conclusion, this rumen anaerobic digestion enhancer improves the energetic efficiency of the rumen fermentation system when low quality roughage based diets are used.

Steers on a field study were weighed off the experiment in a final weighing on the cattle feed trial at Bronco, N. Mex. Both wet and dry powder additions of various formate salts were used with 13.7% increases in feed to gain rations. Tables 5 and 6 are a summary of a 60 day feeding trial.

These steers were fed feed rations at the feedlot constituted of 46% by weight gin trash, 19% by weight brown wheat, 10% corn gluten pellets, 10% of a 70/30 stillage blend step water out of an ethanol process, (70% of the stillage blend step water and 30% syrup); liquid molasses with urea and vitamins 5% by weight; and water constituting the remaining 10% by weight. All six pens were provided with a sodium formate at 1000 ppm of dry gin trash enhancement treatment. The controls were fed the same feed rations as were the enhanced feed rations without the presence of added sodium formate.

perform the control. This is reflected in the feed:gain ratio. What these data show is that the formate salt works very well but that the addition of moisture at this level penalizes the animals in their total intake of energy.

In Table 8, lactating cows are divided into two Groups: Group I and Group II with 150 dairy cows each. Group I cows were the control group with no enhancer added to the roughage diet. Group II cows were provided the same diet as Group I plus the diet was treated with sodium formate enhancer.

TABLE 5

| TREATMENT | PEN NO. | NO. OF STEERS | AVERAGE DAILY GAIN (Lb/d) | FEED:GAIN (DRY MATTER BASIS) |
|---|---|---|---|---|
| CONTROL | 11 | 32 | 3.27 | 8.12 |
| DRY | 16 | 31 | 3.39 | 7.70 |
| WET | 17 | 32 | 3.09 | 8.46 |
| DRY | 18 | 32 | 3.46 | 8.05 |
| WET | 19 | 32 | 2.83 | 8.23 |
| CONTROL | 20 | 31 | 2.76 | 10.13 |

TABLE 6

| TREATMENT | DMI (Lb) | ADG (Lb) | IMPROVEMENT (IN ADG) | F:G RATIO | IMPROVEMENT (IN F:G) |
|---|---|---|---|---|---|
| CONTROL | 27.57 | 3.02 | | 9.13 | |
| DRY | 27.03 | 3.43 | 13.6% | 7.88 | 13.7% |
| WET | 24.72 | 2.96 | | 8.35 | 8.5% |

Summaries of the 60 day field test are presented in Table 7. Feed to Gain ratios are presented at the bottom of Table 7 clearly showing the dry to out perform the so-called wet. However, with both formate treated rations out performing the control.

TABLE 7

SUMMARY OF 60-DAY FIELD TEST WITH GROWING STEERS

| ITEM | CONTROL | DRY | WET | SEM[b] | P[c] |
|---|---|---|---|---|---|
| DRY MATTER FEED INTAKE (Lb/d) | 27.57 | 27.03 | 24.72 | 0.72 | 0.26 |
| AVERAGE DAILY GAIN (Lb/d) | 3.02 | 3.43 | 2.96 | 0.12 | 0.25 |
| FEED:GAIN RATIO | 9.13 | 7.88 | 8.35 | 0.35 | 0.43 |

[a]ANOVA; General Linear Models Procedure with protected LSD
[b]Standard error of the mean, n = 2 pens per treatment
[c]Probability level Assuming that moisture adds nothing to the diet in the form of energy, then both the wet and dry treatments out

TABLE 8

| Lactating Cow Field Trial | |
|---|---|
| Group I - 150 Cows | Control no enhancer added to roughage diet |
| Group II - 150 Cows | Same diet as with Group I cows plus diet treated with sodium formate enhancer |

| | Beginning milk production lbs/cow | 1st Week Average Milk Production lbs/cow | 2nd Week Average Milk Production lbs/cow |
|---|---|---|---|
| Group I | 73.1 | 71.1 | 72.3 |
| Group II | 53.8 | 56.3 | 58.3 |

| | 1st Week Increase or Decrease | 2nd Week Increase or Decrease | Overall |
|---|---|---|---|
| Group I | −2.0 | −0.2 | −0.8 |
| Group II | +2.5 | +2.8 | +4.5 |

| Conclusion: | Group I decreased in production by 8 lbs milk Group II increased in production by 4.5 lbs milk |
|---|---|

TABLE 8-continued

Lactating Cow Field Trial

| | |
|---|---|
| Economic Value: | 4.5 lb. milk @ $0.12 cents/lb = $0.54/cow/day |
| Cost of treatment: | 15# day matter roughage costs $0.4 cents per lb to treat = $0.6 cents/cow/day |
| Therefore: | $.54 cents extra milk produced for cost of $0.6 cents return on investment = $.54 cents divided by $0.6 cents × 100 = 900% |

Ration formula on a feed basis =

| | |
|---|---|
| Brewers Grain | 31.56% by weight |
| Corn Grain | 18.21% by weight |
| Homing Feed | 9.44% by weight |
| Soybean meal | 9.44% by weight |
| Cottonseed, whole/linx | 9.44% by weight |
| Sugar Beet Pulp | 6.74% by weight |
| Coastal Bermuda Hay | 6.07% by weight |
| All purpose general mineral mix | 1.69% by weight |

Note: In each of Group I and Group II about 3 or 4 cows per group of 150 cows were removed as "dry off cows" and replaced with "fresh" cows.

Reagent and Process Costs

The digestibility coefficients for gin trash and coastal Bermuda grass hay roughage were increased by just a few percent or as much as 20% by formate pretreatment. The increases were obtained by contacting the roughage with aqueous solutions containing formates ranging in concentration from 100 ppm to 1000 ppm. These concentrations further translate to actual reagent concentration of 11 ppm to 110 ppm based on the total mass of the treated biomass roughage.

At these low concentration levels the rather expensive formates (>$0.50 per pound) can be utilized without significant cost penalties being applied to the treated roughage. The actual reagent costs for the pretreatment process is in the range of ten to fifteen cents ($0.10 to $0.15) per ton of treated biomass. This cost is small in comparison to the cost for the gin trash or grass hay. For any roughage, the expense of hauling ($5 per ton) must be added to the cost of the roughage at the point of production. For gin trash produced at the gin, the purchase price can range from no cost to as much as $20 per ton depending upon its quality as a cattle feed and on the market demand. The pretreatment processing costs (grinding, solution application, and transfer) can add an estimated additional cost of $10 to $30 per ton for the treated material. These latter cost estimates include allowances for equipment depreciation and labor.

More specifically, with the present technology the major cost factor for chemically pretreating the roughage is that of contacting the very dilute aqueous solutions with the low bulk roughage. Approximately thirty gallons of solution (250 pounds) are required to treat one ton of gin trash or grass hay. This was accomplished in our study by a batch process, wherein a feed mixing truck was used to contact the roughage and the pretreatment solution. For a homogeneous dispersal of the solution on the bulk roughage, the solution was sprayed on the roughage as it turned over in the mixing truck. approximately thirty minutes of mixing time were required per ton of roughage. Ideally the treated roughage should be utilized in the formulated diet as soon as it has been prepared. It was projected that the mechanical processing of the roughage (i.e. loading, mixing, unloading, equipment maintenance and depreciation, etc.) accounts for the largest cost increase for the treated material. With gin trash it appears possible to increase in vitro digestibility from initial levels of 20% to 30% up to range of 35% to 45% for a total average treatment cost of from $25 to $50 per ton of treated roughage. If the treated material is to be ensiled, the basic costs remain constant, but the digestibility coefficient can be boosted to more than 50%. The use of sodium formate as the reagent is particularly attractive since food grade levels can be stored and used with a minimum of safety precautions.

Demonstrated by the invention is that the addition of solutions of low concentrations of sodium formate, with or without other oxidizing reagents, is an effective technology for significantly increasing the digestibility of gin trash and Bermuda grass hay. Recorded increases ranged from as little as 5% to as much as 25% depending on the digestibility of the initial untreated roughage. In most cases for gin trash, a targeted coefficient of +40% OMD (96 hour) or higher was achieved. Reagent chemical costs were small (>$0.15 per ton of roughage) while a total cost of less than $50 per ton of treated roughage appeared feasible. At this level of digestibility the pretreated roughage will compete well with standard alfalfa as a diet roughage.

The increases in the digestibility coefficients achieved with the low level, formate pretreatment processes described shows that gin trash and other similar low grade roughage can, after treatment, be utilized as a larger fraction of the total diet for ruminant animals. It may be that a roughage pretreatment industry to serve the feedlot industry will emerge. If so, the feedlot operator must be able to experience increased flexibility in the variety of roughage available for diet formulations and still experience increases in overall total cost effectiveness and feed efficiencies.

It is to be understood that this invention is not limited to the exact embodiments of the enhancer or methods shown and described, which are merely by way of illustration and not limitation, as various changes may be made therein which are within the spirit of the invention and scope of the claims.

In Table 9 two lots of 15 beef cows each in late gestation were fed diets A and B for over 60 day under dry lot conditions. Group A was fed millet hay and Group B were fed no hay but cotton gin trash treated with sodium formate in amounts of at least 100 ppm in accordance with the invention. All other components of the diets were the same.

TABLE 9

| | Group A | Group B |
|---|---|---|
| Millet Hay | 70.00 | — |
| Cotton Gin Trash | — | 70.00 |
| Ground Corn | 23.50 | 23.50 |
| Soybean Meal | 3.97 | 3.97 |
| Molasses | 1.74 | 1.74 |
| Plain Salt | .54 | .54 |
| Vitamin A Premix | .25 | .25 |

Groups A and B appeared to perform equally well with calving beginning within one month after starting the sixty day test.

What is claimed is:

1. A method for decreasing feed to gain ratio in ruminant animals utilizing a feed ration containing lignocellulose-containing cellulose roughage comprising:

mixing with the roughage at least about 100 ppm by weight of at least one or more formate salts;

and feeding said ration to said animals, thus enhancing ruminant animal digestion of the cellulose roughage through enhanced anaerobic microbial activity in the anaerobic rumen; thereby increasing the gain of ruminant animal weight, wherein the moisture content of said feed ration is less than that required for the growth of mold at ambient temperature.

2. A method for decreasing feed to gain ratio of ruminant animals utilizing a feed ration containing cellulose roughage according to claim 1 wherein said at least one or more formate salts are selected from the group consisting of sodium formate, potassium formate, calcium formate and ammonium formate.

3. A method for decreasing feed to gain ratio of ruminant animals utilizing a feed ration containing cellulose roughage according to claim 1 wherein the formate salts provide enhanced digestion of the cellulose while simultaneously providing buffering capacity in the rumen to maintain the pH at above about 6.5 and below about 7.8.

4. A method for decreasing feed to gain ratio of ruminant animals utilizing a feed ration containing cellulose roughage according to claim 1 wherein the at least about 100 ppm of formate salts is added to the cellulose roughage through utilization of a dry particulate carrier for distribution in the roughage.

5. A method for decreasing feed to gain ratio of ruminant animals utilizing a feed ration containing cellulose roughage according to claim 4 wherein the dry particulate carrier is comprised of a cellulose based material.

6. A method for decreasing feed to gain ratio of ruminant animals utilizing a feed ration containing cellulose roughage according to claim 1 wherein the formate salts are disbursed in a fluid for admixture with the cellulose roughage.

7. A method for decreasing feed to gain ratio of ruminant animals utilizing a feed ration containing cellulose roughage according to claim 1 wherein the decrease in the feed to weight gain ratio is 2% or greater.

8. A method for increasing milk production of dairy cows utilizing a feed ration containing lignocellulose-containing cellulose roughage comprising mixing with the roughage at least about 100 ppm of at least one formate salt;

and feeding said ration to said cows, thus enhancing ruminant animal digestion of the cellulose roughage through enhanced anaerobic microbial activity in the anaerobic rumen; thereby increasing the production of milk of the dairy cows, wherein the moisture content of said feed ration is less than that required for the growth of mold at ambient temperature.

9. A method for increasing milk production of dairy cows according to claim 8 wherein milk production is increased by at least about 2% by weight per day per cow.

10. An enhanced foodstuff for ruminant animals comprising lignocellulose-containing organic matter roughage and a formate salt or mixture of formate salts in an amount of about 100 ppm or greater based on said roughage, said formate salts being capable of enhancing anaerobic microbial activity in the anaerobic rumen, thus promoting digestibility of said roughage, wherein the moisture content of said foodstuff is less than that required for the growth of mold at ambient temperature.

11. An enhanced foodstuff for ruminant animals according to claim 10 which promotes ruminant digestion of cellulose based roughage wherein the formate salts provide buffering capacity and retard the onset of acidosis.

12. An enhanced foodstuff for ruminant animals according to claim 11 which promotes ruminant digestion of raw cellulose based roughage.

13. An enhanced foodstuff for ruminant animals according to claim 11 which promotes digestion of cellulose based roughage wherein the formate salts are disbursed in a dry particulate carrier for disbursion in the roughage.

14. An enhanced foodstuff for ruminant animals according to claim 11 which promotes ruminant digestion of cellulose based roughage wherein the formate salts are disbursed in a fluid for admixing with the roughage.

15. An enhanced foodstuff for ruminant animals according to claim 11 which promotes ruminant digestion of cellulose based roughage wherein the cellulose based roughage and formate salts are added with other feed rations.

16. An enhanced foodstuff for ruminant animals according to claim 11 which promotes ruminant digestion of cellulose based roughage wherein enhanced digestion results in an at least 5% decrease in feed to weight gain ratio for cattle as compared to those fed the same cellulose based roughage without the added formate salts.

17. An enhanced foodstuff for ruminant animals according to claim 11 which promotes ruminant digestion of cellulose based roughage wherein the enhanced digestion results in increased production of milk from bovines as compared to those fed the same cellulose based roughage without the formate salts.

18. An enhanced foodstuff for ruminants which promotes digestion of cellulose based roughage according to claim 1 wherein the formate salts are present at least 100 ppm or greater inclusive of grains, alfalfa and fodder rations.

19. An enhanced foodstuff for ruminants comprising lignocellulose-containing organic matter roughage and a formate salt or mixture of formate salts in an amount of 100 ppm or greater, based on said roughage, said formate salts being capable of enhancing anaerobic microbial activity in the anaerobic rumen, promoting thus promoting digestibility of said roughage, the formate salt or mixture of formate salts being selected from the group consisting of sodium formate, potassium formate, calcium formate and ammonium formate, wherein the moisture content of said foodstuff is less than that required for the growth of mold at ambient temperature.

* * * * *